(12) United States Patent
Burleson et al.

(10) Patent No.: US 12,619,844 B1
(45) Date of Patent: May 5, 2026

(54) LAW POSTER COMPLIANCE SYSTEM AND METHOD

(71) Applicant: J. J. Keller & Associates, Inc., Neenah, WI (US)

(72) Inventors: Benjamin L. Burleson, College Station, TX (US); Joslyn B. Siewert, Oshkosh, WI (US); Paul E. Paulick, Oshkosh, WI (US); Robert R. Larsen, Appleton, WI (US); Thomas A. Ditzler, Neenah, WI (US)

(73) Assignee: J. J. Keller & Associates, Inc., Neenah, WI (US)

( * ) Notice: Subject to any disclaimer, the term of this patent is extended or adjusted under 35 U.S.C. 154(b) by 0 days.

(21) Appl. No.: 19/339,614

(22) Filed: Sep. 25, 2025

(51) Int. Cl.
*G06K 7/10* (2006.01)
*G06Q 50/26* (2012.01)

(52) U.S. Cl.
CPC ..... *G06K 7/10445* (2013.01); *G06K 7/10198* (2013.01); *G06Q 50/26* (2013.01)

(58) Field of Classification Search
CPC . G06K 7/10445; G06K 7/10198; G06Q 50/26
USPC ........................................................ 235/436
See application file for complete search history.

(56) References Cited

U.S. PATENT DOCUMENTS

| | | | | |
|---|---|---|---|---|
| 2008/0262883 A1* | 10/2008 | Weiss | ................... | G06Q 30/018 |
| | | | | 705/7.42 |
| 2015/0379521 A1 | 12/2015 | Weiss et al. | | |
| 2017/0124361 A1 | 5/2017 | Wilfred | | |
| 2020/0126040 A1* | 4/2020 | Chilaka | ................ | G06Q 20/203 |

FOREIGN PATENT DOCUMENTS

| | | |
|---|---|---|
| CN | 110175876 | 8/2019 |
| KR | 1020090101327 | 9/2009 |

OTHER PUBLICATIONS

Machine translation of the written description (specification) KR20090101327 to Jung et al. https://worldwide.espacenet.com/ (Year: 2009).*

* cited by examiner

*Primary Examiner* — Daniel A Hess
(74) *Attorney, Agent, or Firm* — Wong Meyer Smith & McConnell

(57) ABSTRACT
A law poster compliance system and method including a law poster having an RFID tag thereon, a verification reader removably securable to the law poster and having a housing and a central controller in communication with a modem, a battery, an RFID reader and a display, and a content management database for determining if the law poster is compliant with federal, state and local laws and regulations. The display includes a compliant indicator that is displayed if the content management database determines the law poster is compliant. The display includes an indicator that is displayed if the content management database determines the law poster is not compliant.

20 Claims, 5 Drawing Sheets

16

28

16

28

LAW POSTER COMPLIANCE SYSTEM AND METHOD

FIELD OF THE INVENTION

The invention relates to a law poster compliance system and method where no effort required by an end user to verify LLP compliance with federal, state and local laws and regulations. Compliant LLP status is verified and displayed without the end user having to interact with the LLP or without having to interact with a website or application.

BACKGROUND OF THE INVENTION

Labor law posters (LLPs) are postings that are required to be displayed in workplaces throughout the United States. They inform employees of their federal and state rights within the workplaces. Employers can be subject to fines or other penalties if they do not properly display them for their employees. Frequently, updates are made to various state and federal labor law posters which require employers to update the labor law posters displayed, and it can be difficult for employers to know whether or not their posters are up to date or if they are out of compliance.

Employers can use a subscription service in an attempt to maintain display of compliant LLPs where up to date LLPs are provided by a third party if there have been any changes or updates for the employer's location(s). While this gives employers access to the new compliant LLPs, it stops short of ensuring that the new compliant LLPs arrive at their final destination and are actually posted. LLPs can include a QR code that can be scanned by the employer to verify if an LLP is compliant or if an update is needed, but many employers do not use the scan feature, resulting in employers posting out-of-date, non-compliant LLPs.

SUMMARY OF THE INVENTION

In one construction, the disclosure provides a law poster compliance method that requires no end user effort The method including the steps of procuring a law poster having an RFID tag thereon, securing a verification reader to the law poster, the verification reader including a controller in communication with a modem, an RFID reader and a display, periodically enabling the RFID reader to read the RFID tag and communicate with a content management database to determine if the law poster is compliant with federal, state and local laws and regulations, if the law poster is compliant, displaying a compliance indicator on the display of the verification reader and if the law poster is not compliant, displaying a non-compliance indicator on the display of the verification reader.

In another construction, the disclosure provides a labor law poster compliance method that requires no end user effort The method includes the steps of procuring a labor law poster having an RFID tag thereon, securing a verification reader to the labor law poster, the verification reader including a controller in communication with a modem, a battery, an RFID reader and a display, periodically enabling the RFID reader to read the RFID tag to determine and verify the iteration of the labor law poster it is secured to and thereafter entering a sleep cycle for a set period of time, periodically enabling the RFID reader to read the RFID tag and communicate with a content management database to determine if the labor law poster is compliant with federal, state and local laws and regulations, if the labor law poster is compliant, displaying a compliance indicator on the display of the verification reader and thereafter entering a second sleep cycle and if the labor law poster is not compliant, displaying a non-compliance indicator on the display of the verification reader.

In another construction, the disclosure provides a law poster compliance method that requires no end user effort. The method including the steps of procuring a law poster having an RFID tag thereon, removably securing a verification reader to the law poster, the verification reader including a controller in communication with a modem, an RFID reader and a display, periodically enabling the RFID reader to read the RFID tag and communicate with a content management database to determine if the law poster is compliant with federal, state and local laws and regulations, if the law poster is compliant, displaying a compliance indicator on the display of the verification reader, if the law poster is not compliant, displaying a non-compliance indicator on the display of the verification reader and if the first law poster is replaced by a second compliant law poster having an RFID tag thereon, removing the verification reader from the first law poster and removably securing the verification reader to the second compliant law poster.

In another construction, the disclosure provides a law poster compliance system including a law poster having an RFID tag thereon, a verification reader removably securable to the law poster and having a housing and a central controller in communication with a modem, an RFID reader and a display and a content management database for determining if the law poster is compliant with federal, state and local laws and regulations. The display includes a compliance indicator that is displayed if the content management database determines the law poster is compliant and a non-compliance indicator that is displayed if the content management database determines the law poster is not compliant.

Other aspects of the disclosure will become apparent by consideration of the detailed description and accompanying drawings.

BRIEF DESCRIPTION OF THE DRA WINGS

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

The invention is a law poster compliance system and method where there is no effort required by an end user to verify law poster compliance with federal, state and local laws and regulations. Compliant LLP status is verified and displayed without the end user having to interact with the law poster or without having to interact with a website or application. If the end user subscribes to receiving automatic law poster updates in the mail, they will receive an updated law poster without any additional steps. If the end user does not subscribe, the system includes a display that prompts them to order and display an updated compliant law poster.

The law poster compliance system and method are described hereafter with respect to a labor law poster (LLP). However, it should be noted that any other types of law posters that are required to be display can be utilized with the invention.

Figure 1:
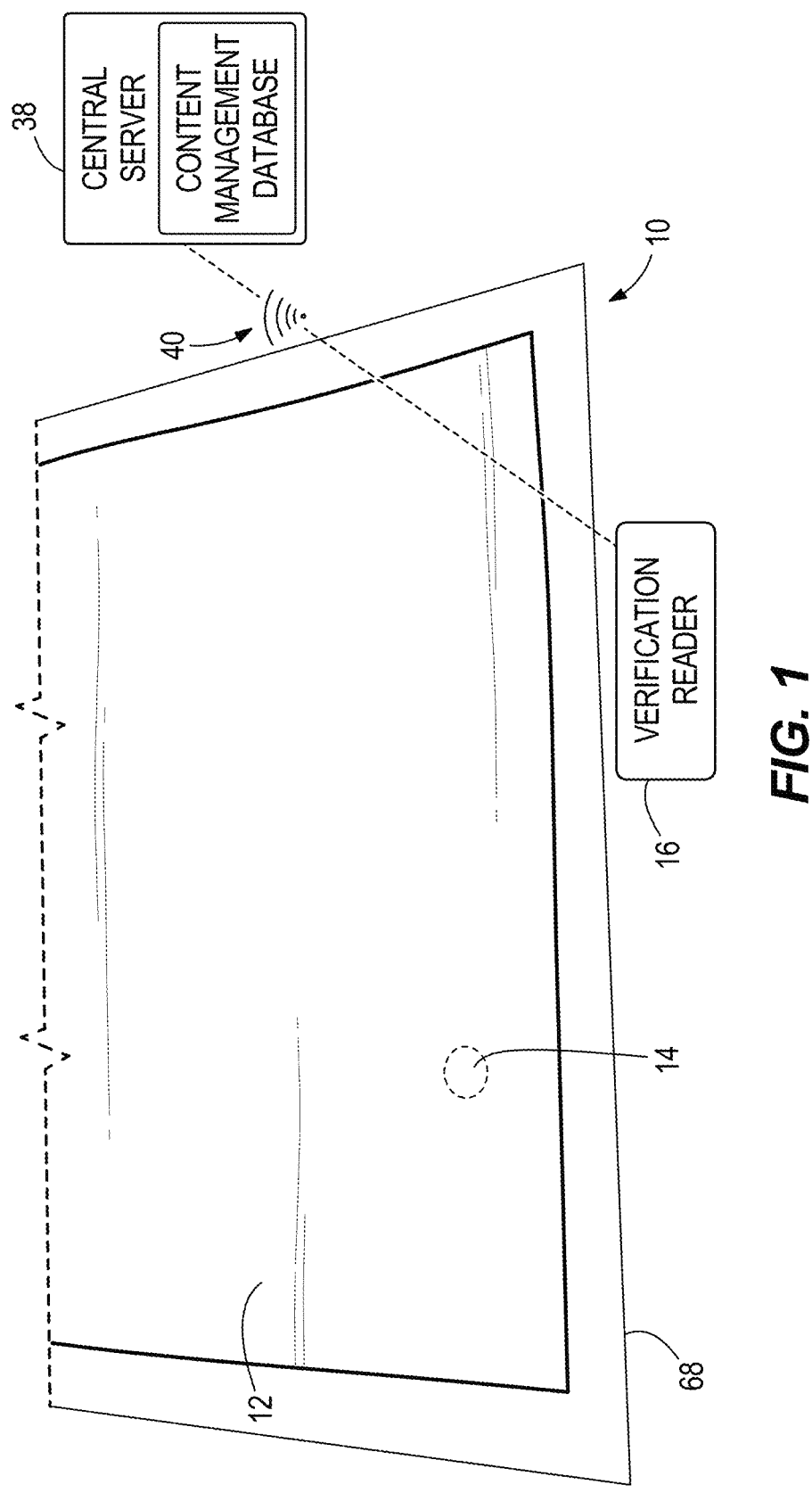
FIG. 1 is a rear plan view of a law poster compliance system.

As shown in FIG. 1, the law poster compliance system 10 includes a paper LLP 12 having an RFID tag 14 attached to the back of the LLP 12 such as by pressure-sensitive adhesive, however, other attachment methods can also be utilized. An example of a suitable RFID tag 14 includes model NXP NTAG213 available from Vulcan RFID. The RFID tag 14 is programmed with the specifics of the LLP 12 it is attached to.

Figure 2:
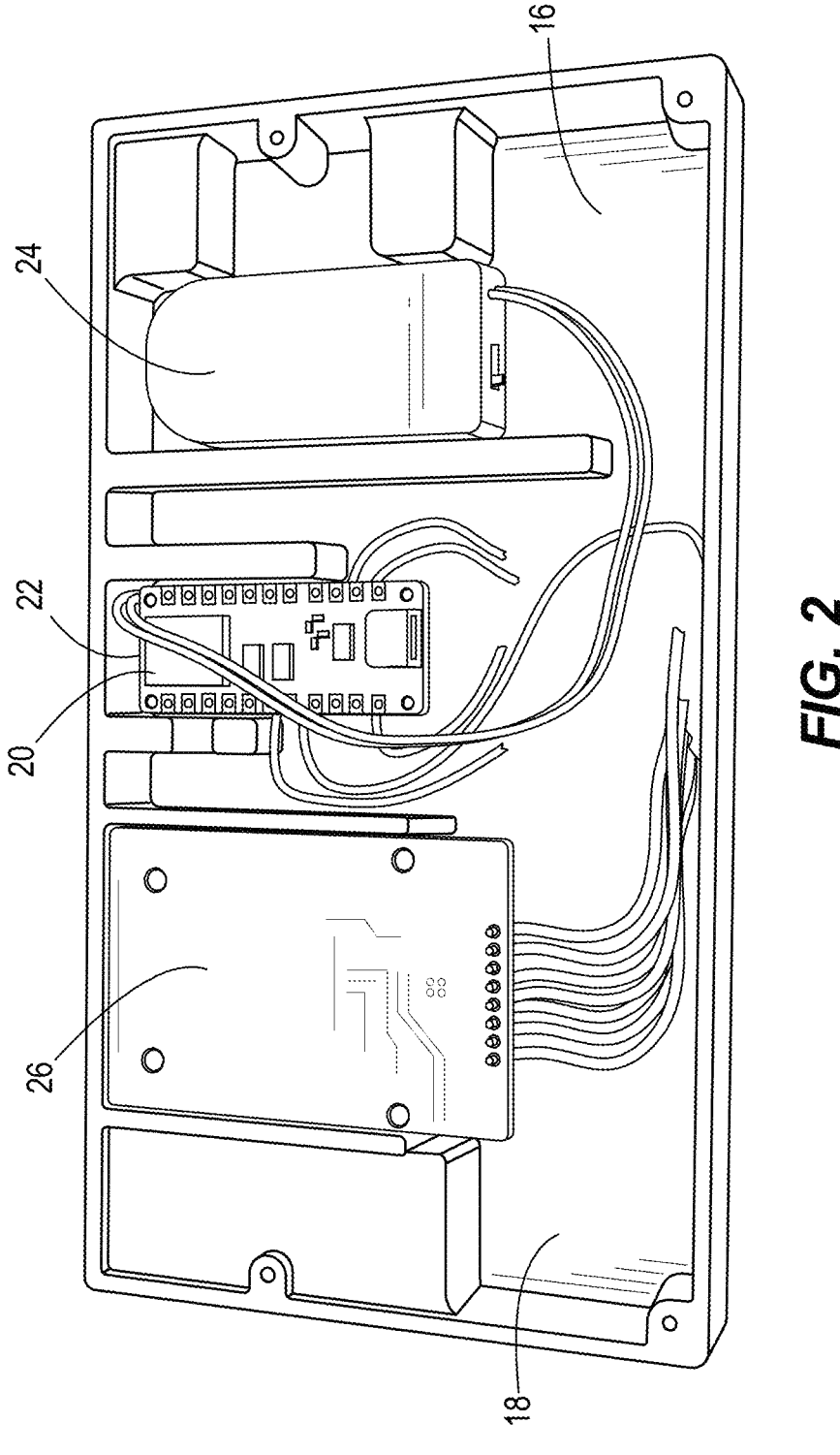
FIG. 2 is a rear plan view of a verification reader.

As shown in FIGS. 1 and 2, the system 10 further includes a verification reader 16. The verification reader 16 is removably attached to the LLP 12 such as on the bottom edge or corner as is shown, however, other attachment locations can also be utilized. The verification reader 16 can be attached to the LLP 12 magnetically or attached using other suitable methods such as by adhesive. Additionally, the verification reader can be embedded in a frame 66 into which the LLP 12 is inserted and displayed.

As shown specifically in FIG. 2, the verification reader 16 includes a housing 18 having therein a central controller 20 in communication with a modem 22, a battery 24, an RFID reader 26 and a display 28.

The modem 22 can be of the Wi-Fi or cellular type such as model NORA-W106 available from u-blox.

An example of a suitable RFID reader 26 is model MFRC522 available from NXP Semiconductors. The RFID reader 26 is configured to be in communication with the RFID tag 14 on the LLP 12.

Figure 3:
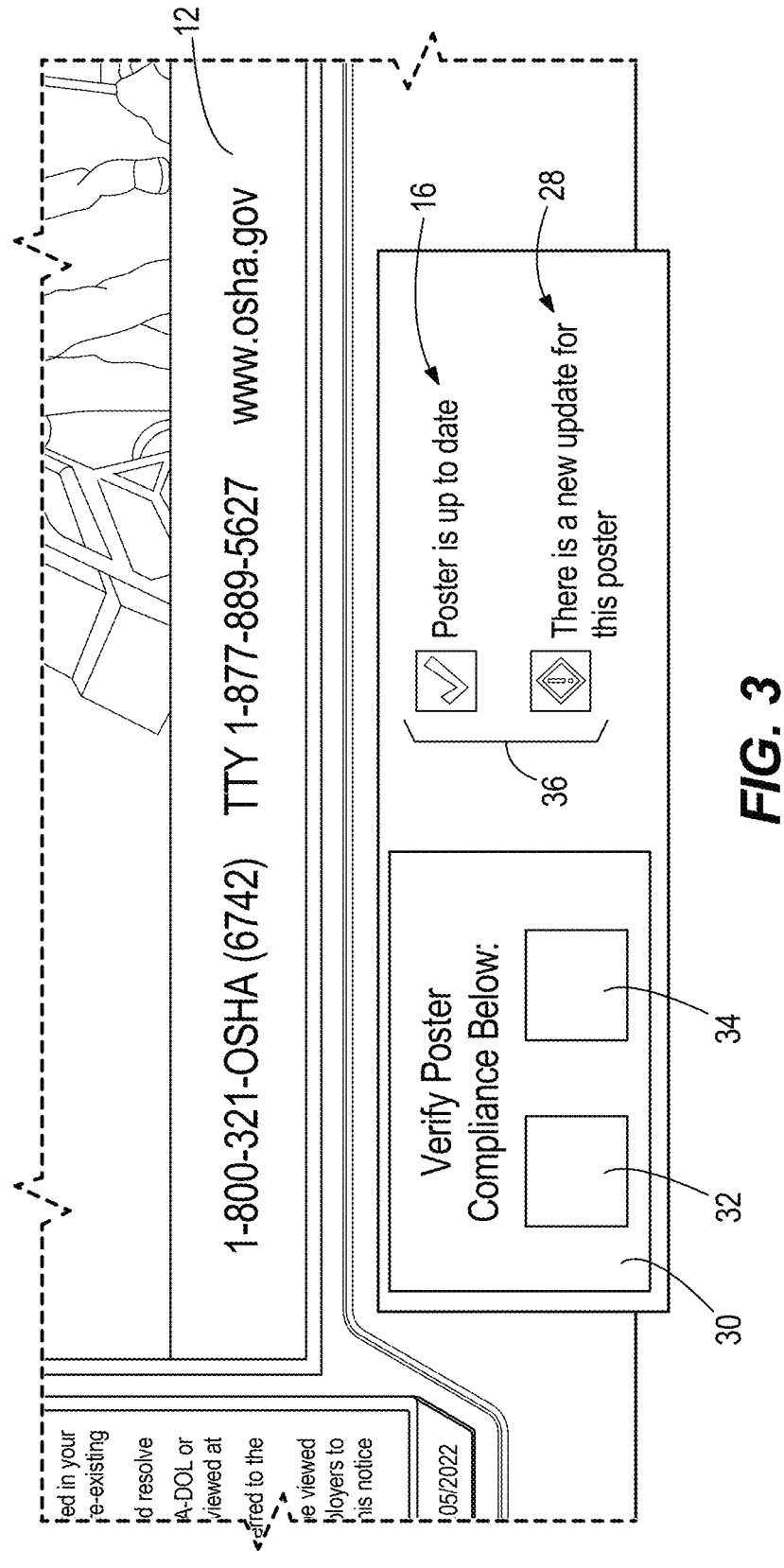
FIG. 3 is a front partial view of a labor law poster with verification reader attached thereto.
Figures 4, 5:
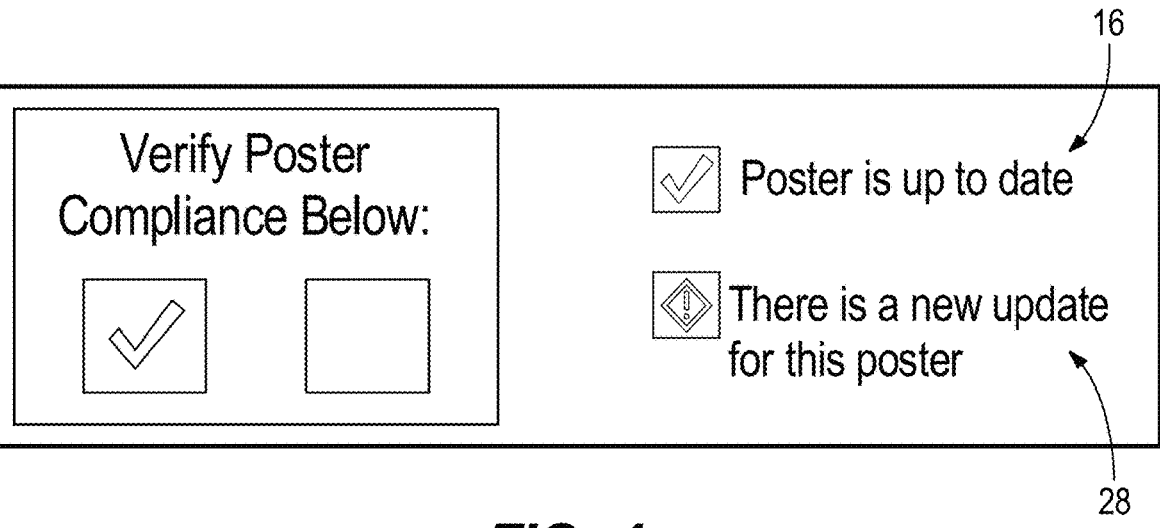
FIG. 4 is a front view of a display of the verification reader indicating the labor law poster is compliant.
FIG. 5 is a front view of the display of the verification reader indicating the labor law poster is not compliant.

Referring to FIGS. 3-5, the display 28 is preferably a low-power or bistable display such as model E2152KSOJ available from Pervasive Displays. Because the display 28 requires very little power to maintain, the verification reader 16 spends most of its time not utilizing any power from the battery 24 thus extending battery life. The display 28 includes an indicator 30 for notifying an end user whether the LLP 12 is up to date and compliant. The indicator 30 can include audio and/or visual components. As shown in FIG. 3, an example of an indicator 30 includes a first indicator area 32, a second indicator area 34 and indicia 36 as will be explained in more detail below.

As shown in FIG. 1, the verification reader 16 is in communication with a central server and content management database 38 using the modem 22 communicating over a network 40 such as Wi-Fi for example, however, other networks can be utilized.

Figure 6:
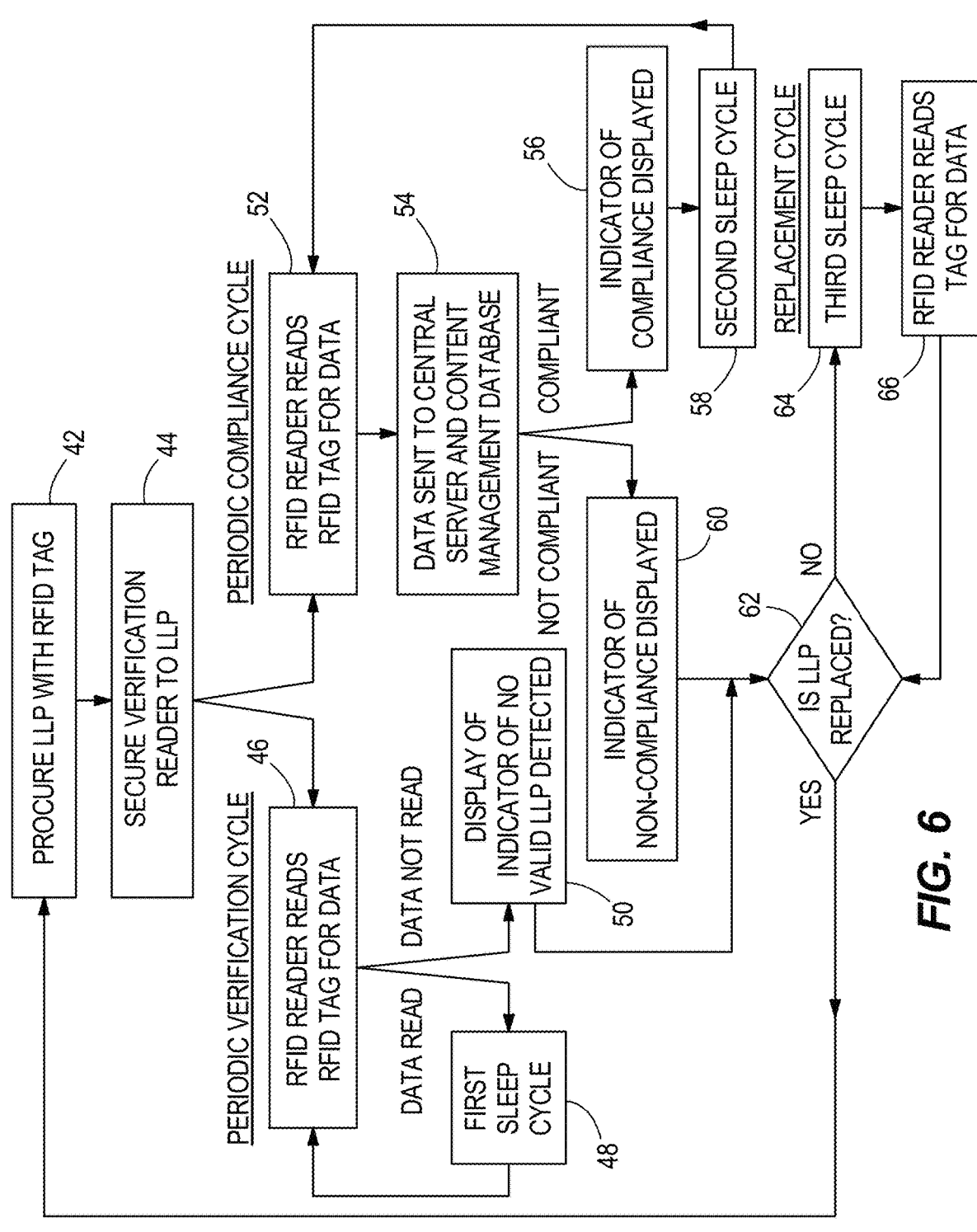
FIG. 6 is a flowchart of the operation of the law poster compliance system and method.

With reference to FIGS. 4-6, the operation of the law poster compliance system and method are shown. At step 42, an end user procures an LLP 12 having there on the RFID tag 14. At step 44, the verification reader 16 is secured to the LLP 12. At step 46, a periodic verification cycle starts with the RFID reader 26 being activated and looking for an RFID tag 14. When the RFID reader 26 finds the RFID tag 14, data is read by the RFID reader 26 such an SAP number and such as the identity and iteration of LLP poster it is attached to. Data can include the federal or state version of the LLP 12 and a publishing date, however, other data can also be read and utilized. The system 10 then enters a first sleep mode at step 48 for a set period of time. The period of time, for example, can be daily or a few times per week, however, any other time periods can be utilized. If the RFID reader 26 does not find an RFID tag such as it has been removed from the LLP 12 or becomes inadvertently detached, at step 50, the system 10 alerts the central server and content management database 38 that a valid LLP has not been read and the second indicator area 34 is activated such as shown in FIG. 5 by the warning symbol on the display until a valid RFID tag 14 has been read. Alternately, a third indicator area (not shown) can be provided on the display 28 to indicate no valid LLP has been detected.

The system 10 includes a periodic compliance cycle. During the compliance cycle, at step 52, the verification reader 16 reads the RFID tag 14 including for example reading the identity and iteration of LLP poster 12 it is attached to. Data can include the federal or state version of the LLP 12 and a publishing date, however, other data can also be read and utilized. At step 54, the verification reader 16 communicates the data via the modem 22 and network 40 to the central server and content management database 38 to determine if the LLP 12 is compliant with federal, state and local laws and regulations.

If the central server and content management database 38 determines the LLP 12 is up to date and compliant, at step 56, a signal is sent from the central server and content management database 38 to the verification reader 16 and the first indicator area 32 is activated such as shown in FIG. 4 by the check mark on the display 28. The system 10 then enters a second sleep cycle for the set period of time at step 58 with the check mark remaining visible. The set period of time is, for example, weekly or monthly, however, any other time periods can be utilized. At the end of the second sleep cycle, the compliance cycle starts again at step 52.

If the LLP 12 is determined to not be compliant, at step 60, a signal is sent from the central server and content management database 38 to the verification reader 16 and the second indicator area 34 is activated such as shown in FIG. 5 by the warning symbol on the display 28. At step 62, the end user can then replace the LLP 12 with a procured, up to date compliant version and the method starts again at step 42 with the verification reader 16 being secured to a new updated compliant LLP 12. If the end user does not replace the outdated non-compliant LLP 12, a third sleep cycle is initiated at step 64 with the warning symbol remaining visible. The period of time for the third sleep cycle, for example, can be one hour, however, any other time periods can be utilized as well as utilizing the same time period as with the first or second sleep cycle. At the end of the third sleep cycle, the verification reader 16 starts a replacement cycle with the RFID reader 26 reading the RFID tag 14 again as step 66.

If the end user has signed up for a subscription model and the system 10 determines their LLP 12 is not compliant, an updated compliant LLP can automatically be sent to the end user.

Various features and advantages of the invention are set forth in the following claims.

What is claimed is:
1. A law poster compliance method that requires no end user effort, the method comprising the steps of:
   procuring a law poster having an RFID tag thereon;
   securing a verification reader to the law poster, the verification reader including a controller in communication with a modem, an RFID reader and a display;

periodically enabling the RFID reader to read the RFID tag and communicate with a content management database to determine if the law poster is compliant with federal, state and local laws and regulations;

if the law poster is compliant, displaying a compliance indicator on the display of the verification reader; and if the law poster is not compliant, displaying a non-compliance indicator on the display of the verification reader.

2. The method of claim 1 wherein the compliance indicator is a visual indicator.

3. The method of claim 1 wherein the non-compliance indicator is a visual indicator.

4. The method of claim 1 wherein the verification reader includes a battery.

5. The method of claim 1 wherein the verification reader is secured to the law poster magnetically.

6. The method of claim 1 wherein the verification reader is secured to a frame attached to the law poster.

7. The method of claim 1 wherein the display is a low power consumption display.

8. The method of claim 1 wherein periodically enabling the RFID reader to read the RFID tag occurs in a set time period ranging from one week to several months.

9. The method of claim 1 wherein the verification reader is removably secured to the law poster.

10. The method of claim 1 wherein the law poster is a labor law poster.

11. A labor law poster compliance method that requires no end user effort, the method comprising the steps of:

procuring a labor law poster having an RFID tag thereon;

securing a verification reader to the labor law poster, the verification reader including a controller in communication with a modem, a battery, an RFID reader and a display;

periodically enabling the RFID reader to read the RFID tag to determine and verify the iteration of the labor law poster it is secured to and thereafter entering a sleep cycle for a set period of time;

periodically enabling the RFID reader to read the RFID tag and communicate with a content management database to determine if the labor law poster is compliant with federal, state and local laws and regulations;

if the labor law poster is compliant, displaying a compliance indicator on the display of the verification reader and thereafter entering a second sleep cycle; and if the labor law poster is not compliant, displaying a non-compliance indicator on the display of the verification reader.

12. A law poster compliance method that requires no end user effort, the method comprising the steps of:

procuring a law poster having an RFID tag thereon;

removably securing a verification reader to the law poster, the verification reader including a controller in communication with a modem, an RFID reader and a display;

periodically enabling the RFID reader to read the RFID tag and communicate with a content management database to determine if the law poster is compliant with federal, state and local laws and regulations;

if the law poster is compliant, displaying a compliance indicator on the display of the verification reader;

if the law poster is not compliant, displaying a non-compliance indicator on the display of the verification reader; and if the first law poster is replaced by a second compliant law poster having an RFID tag thereon, removing the verification reader from the first law poster and removably securing the verification reader to the second compliant law poster.

13. A law poster compliance system comprising:

a law poster having an RFID tag thereon;

a verification reader removably securable to the law poster and having a housing and a central controller in communication with a modem, an RFID reader and a display; and a content management database for determining if the law poster is compliant with federal, state and local laws and regulations;

wherein the display includes a compliance indicator that is displayed if the content management database determines the law poster is compliant and a non-compliance indicator that is displayed if the content management database determines the law poster is not compliant.

14. The system of claim 13 wherein the compliance indicator is a visual indicator.

15. The system of claim 13 wherein the non-compliance indicator is a visual indicator.

16. The system of claim 13 wherein the verification reader includes a battery.

17. The system of claim 13 wherein the verification reader is removably secured to the law poster magnetically.

18. The system of claim 13 wherein the verification reader is removably secured to a frame attached to the law poster.

19. The system of claim 13 wherein the display is a low power consumption display.

20. The system of claim 13 wherein the law poster is a labor law poster.

* * * * *